(12) United States Patent
Schmelz et al.

(10) Patent No.: US 9,769,024 B2
(45) Date of Patent: Sep. 19, 2017

(54) SELF-ORGANIZING NETWORK EMPLOYING MEASUREMENT INTERVALS

(75) Inventors: Lars Christoph Schmelz, Haar (DE); Tobias Bandh, Reutlingen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 8 days.

(21) Appl. No.: 14/394,186

(22) PCT Filed: Apr. 11, 2012

(86) PCT No.: PCT/EP2012/056509
§ 371 (c)(1),
(2), (4) Date: Mar. 20, 2015

(87) PCT Pub. No.: WO2013/152787
PCT Pub. Date: Oct. 17, 2013

(65) Prior Publication Data
US 2015/0222488 A1    Aug. 6, 2015

(51) Int. Cl.
*H04L 12/24*    (2006.01)
*H04W 24/02*    (2009.01)
*H04L 12/26*    (2006.01)
*H04W 24/10*    (2009.01)
*H04W 84/18*    (2009.01)

(52) U.S. Cl.
CPC ...... *H04L 41/0873* (2013.01); *H04L 41/0886* (2013.01); *H04L 41/5054* (2013.01); *H04L 43/067* (2013.01); *H04W 24/02* (2013.01); *H04W 24/10* (2013.01); *H04W 84/18* (2013.01)

(58) Field of Classification Search
CPC ............. H04L 41/0873; H04L 41/0886; H04L 41/5054; H04L 43/067; H04W 24/02; H04W 2/10; H04W 84/18
See application file for complete search history.

(56) References Cited

U.S. PATENT DOCUMENTS

| | | | |
|---|---|---|---|
| 7,509,097 B2 | 3/2009 | Irie et al. | |
| 2006/0176824 A1* | 8/2006 | Laver | H04L 41/00 370/241 |
| 2009/0111382 A1 | 4/2009 | Yao | |

(Continued)

FOREIGN PATENT DOCUMENTS

| | | |
|---|---|---|
| CN | 101626626 A | 1/2010 |
| JP | 2006/229612 A | 8/2006 |

(Continued)

OTHER PUBLICATIONS

Tobias Bandh; "Coordination of autonomic function execution in Self-Organizing Networks", Network Architectures and Services NET Apr. 1, 2013; TUM (Technische Universitaet Muenchen).

(Continued)

*Primary Examiner* — Ian N Moore
*Assistant Examiner* — Latresa McCallum
(74) *Attorney, Agent, or Firm* — Squire Patton Boggs (US) LLP

(57) ABSTRACT

A method comprising: determining within a measurement interval at least one effective network control function instance; selecting a subsequent measurement interval measurement data for at least one succeeding function; and executing the at least one succeeding function dependent on the subsequent measurement interval measurement data.

10 Claims, 15 Drawing Sheets

(56) References Cited

U.S. PATENT DOCUMENTS

2011/0261721 A1* 10/2011 Zhou .................. H04W 16/32
                                                            370/254
2013/0130627 A1*  5/2013 Fukuta ................ H04W 24/10
                                                            455/67.11

FOREIGN PATENT DOCUMENTS

WO         2010146674 A1    12/2010
WO    WO 2011/082826 A1      7/2011

OTHER PUBLICATIONS

3GPP TS 32.500 V10.1.0 (Sep. 2010); 3rd Generation Partnership Project; Technical Specification Group Services and System Aspects; Telecommunication Management; Self-Organizing Networks (SON); Concepts and requirements (Release 10).

S5-113599; "Add requirement on time interval for SON coordination"; Change Request; 3GPP TSG SA WG5 (Telecom Management) Meeting #80; Nov. 14-18, 2011; San Francisco, USA.

Seppo Hamalainen, et al.; LTE Self-Organising Networks (SON): Network Management Automation for Operational Efficiency; Wiley & Sons, Feb. 2012.

Japanese Office Action Notification of Reasons for Refusal application No. 2015-504867 dated Nov. 5, 2015.

Tobias Bandh et al: "Policy-based coordination and management of SON functions", Integrated Network Management (IM), 2011IFIP/IEEE International Symposium on, IEEE,May 23, 2011 (May 23, 2011), pp. 827-840, XP032035329, DOI: 10.1109/INM.2011.5990492 ISBN: 978-1-4244-9219-0 p. 831-p. 837.

International Search Report and Written Opinion dated Jan. 31, 2013 corresponding to International Patent Application No. PCT/EP2012/056509.

State Intellectual Property Office, P.R. China, Office Action corresponding to Chinese Patent Appln. No. 01280073878.7, dated Jul. 3, 2017.

* cited by examiner 201. network layer design  271. network layer
203. network planning operator  273. actuator
205. policy operator  275. sensor
207. SON operator  277. network element
251. SON management controller  279. network layer policy
253. repository         enforcement processor
255. policy storage
257. SON management controller processor

SELF-ORGANIZING NETWORK EMPLOYING MEASUREMENT INTERVALS

FIELD OF APPLICATION

The invention relates to network coordination apparatus for configuring one or more network entities, but not exclusively limited to configuring one or more network entities within a self-organising network.

BACKGROUND OF APPLICATION

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems a network element or network entity (NE) or access node is provided by a base station. The radio coverage area of a base station is known as a cell, and therefore the wireless systems are often referred to as cellular systems. In some systems, for example a 3GPP standard system, a base station access node is called Node B (NB) or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

In wireless systems a communication device provides a transceiver station that can communicate with the access node and/or another communications device. A communication device or user equipment may also be considered as being a part of a communication system. In certain applications, for example in ad-hoc networks, the communication system can be based on use of a plurality of user equipment capable of communicating with each other.

Network management is a complex task. Complexity arises on the one side from the number of network elements (NEs) that have to be deployed and managed, and on the other side from interdependencies between the configuration and the status of the deployed network elements in terms of performance, faults, etc. In a heterogeneous network the variety of deployed technologies and their proprietary operational paradigms are difficult to handle. A heterogeneous network for example, can be a network consisting of a multitude of access technologies, and different (cell) layers within these access technologies. A layer in a wireless network access technology is characterised by for example the size or geographical area covered by one network element, the transmission power, the bandwidth, the maximum throughput. Examples of cell layers are macro cells, micro and pico cells (for hotspot and enterprise coverage), and indoor cells. Furthermore some cells may only serve closed user groups.

The configuration, optimisation and troubleshooting of the management of the network therefore requires high expertise and operational management workflows to be typically performed by human operators supported by software tools. However, such manual and semi-automated management is time-consuming, error-prone, and potentially unable to react quickly enough to network changes and thus expensive.

It has been a goal of network management designers to attempt to automate operation, administration and management (OAM) functions by the deployment of "Self Organising Networks" (SON). While SON concepts are generically applicable, these focus of developments has been to Radio Access Networks (RAN) due to the large number of NE (radio base stations) distributed over large geographical areas (and thus the incurred cost to doing remote and on-site management activities). In particular, for the long term evolution (LTE) and long term evolution-advanced (LTE-A) radio access network (RAN) standards such as evolved universal mobile telecommunications system (UMTS) Terrestrial Radio Access Network (E-UTRAN), SON is considered a crucial building block, due to the anticipated high degree of distribution and heterogeneity. In other words in such networks there is expected to be a wide range of telecommunications standards being employed such as concurrent operation of 2G/3G/LTE/LTE-A network elements. Furthermore the LTE networks are believed to also be heterogeneous in structure, for example employing LTE multi-layer structures where there can be pico cells, micro cells, and macro cells all operating over the same geographical range.

Typically the SON is implemented by the application of SON functions which monitor, plan and enforce control over network elements. However because the operation of SON functions is individual and dynamic (i.e., not pre-planned), the application of SON function instances can have run-time interactions with other SON functions instances.

STATEMENT OF APPLICATION

In accordance with an embodiment there is provided a method comprising: determining within a measurement interval at least one effective network control function instance; selecting a subsequent measurement interval measurement data for at least one succeeding function; and executing the at least one succeeding function dependent on the subsequent measurement interval measurement data.

Selecting a subsequent measurement interval measurement data for at least one succeeding function may comprise: selecting a subsequent measurement interval measurement data with an associated unset or reset measurement flag.

The method may further comprise: setting a measurement flag dependent on determining the effective network control function instance within the measurement interval; and resetting/unsetting the measurement flag on determining a succeeding measurement interval following an end of the at least one function instance visibility delay period.

Selecting a subsequent measurement interval measurement data for at least one succeeding function may comprise: extending at least one function instance visibility delay period to end substantially at the end of the measurement interval; and selecting the subsequent measurement interval following an end of the at least one function instance visibility delay period to provide measurement data.

Extending the at least one function instance visibility delay period to end substantially at the end of the measurement interval may comprise: determining the end of a visibility delay period; determining a remaining measurement interval period; and determining a visibility delay period extension for the remaining measurement interval period.

Selecting a subsequent measurement interval measurement data for at least one succeeding function may comprise: extending a succeeding function protection time period to end substantially following the end of the subsequent measurement interval; and selecting the subsequent measurement interval to provide measurement data.

Extending the succeeding function protection time period to end substantially following the end of the subsequent measurement interval may comprise: determining an end of a visibility delay period; determining a remaining measurement interval period; and determining a protection delay period extension for the remaining measurement interval period.

Selecting a subsequent measurement interval measurement data for at least one succeeding function may comprise: controlling the measurement interval period; and selecting the controlled subsequent measurement interval to provide measurement data.

Controlling the measurement interval period may comprise: pausing the generation of further measurement interval periods dependent on determining within a measurement interval at least one effective network control function instance; and generating a subsequent measurement interval dependent on determining the at least one effective network control function instance.

According to a second aspect there is provided an apparatus comprising: an instance determiner configured to determine within a measurement interval at least one effective network control function instance; a data selector configured to select a subsequent measurement interval measurement data for at least one succeeding function; and an instance executor configured to execute the at least one succeeding function dependent on the subsequent measurement interval measurement data.

The data selector may be configured to select a subsequent measurement interval measurement data with an associated unset or reset measurement flag.

The apparatus may comprise: a measurement flag setter configured to set a measurement flag dependent on determining the effective network control function instance within the measurement interval; and a measurement flag clearer configured to reset/unset the measurement flag on determining a succeeding measurement interval following an end of the at least one function instance visibility delay period.

The data selector may be configured to: extend at least one function instance visibility delay period to end substantially at the end of the measurement interval; and select the subsequent measurement interval following an end of the at least one function instance visibility delay period to provide measurement data.

The data selector configured to extend the at least one function instance visibility delay period to end substantially at the end of the measurement interval may comprise: a visibility delay period determiner configured to determine the end of a visibility delay period; a measurement period determiner configured to determine a remaining measurement interval period; and a visibility delay extender configured to determine a visibility delay period extension for the remaining measurement interval period.

The data selector may be configured to: extend a succeeding function protection time period to end substantially following the end of the subsequent measurement interval; and select the subsequent measurement interval to provide measurement data.

The data selector configured to extend the succeeding function protection time period to end substantially following the end of the subsequent measurement interval may comprise: a visibility delay period end determiner configured to determine an end of a visibility delay period; a measurement period determiner configured to determine a remaining measurement interval period; and a protection delay period extender configured to determine a protection delay period extension for the remaining measurement interval period.

The data selector may be configured to: control the measurement interval period; and select the controlled subsequent measurement interval to provide measurement data.

The data selector configured to control the measurement interval period may comprise: an interval clock interrupter configured to pause the generation of further measurement interval periods dependent on determining within a measurement interval at least one effective network control function instance; and an interval clock starter configured to generate a subsequent measurement interval dependent on determining the at least one effective network control function instance.

According to a third aspect there is provided apparatus comprising at least one processor and at least one memory including computer code for one or more programs, the at least one memory and the computer code configured to with the at least one processor cause the apparatus to at least perform: determining within a measurement interval at least one effective network control function instance; selecting a subsequent measurement interval measurement data for at least one succeeding function; and executing the at least one succeeding function dependent on the subsequent measurement interval measurement data.

Selecting a subsequent measurement interval measurement data for at least one succeeding function may cause the apparatus to perform selecting a subsequent measurement interval measurement data with an associated unset or reset measurement flag.

The apparatus may be configured to perform: setting a measurement flag dependent on determining the effective network control function instance within the measurement interval; and resetting/unsetting the measurement flag on determining a succeeding measurement interval following an end of the at least one function instance visibility delay period.

Selecting a subsequent measurement interval measurement data for at least one succeeding function may cause the apparatus to perform: extending at least one function instance visibility delay period to end substantially at the end of the measurement interval; and selecting the subsequent measurement interval following an end of the at least one function instance visibility delay period to provide measurement data.

Extending the at least one function instance visibility delay period to end substantially at the end of the measurement interval may cause the apparatus to perform: determining the end of a visibility delay period; determining a remaining measurement interval period; and determining a visibility delay period extension for the remaining measurement interval period.

Selecting a subsequent measurement interval measurement data for at least one succeeding function may cause the apparatus to perform: extending a succeeding function protection time period to end substantially following the end of the subsequent measurement interval; and selecting the subsequent measurement interval to provide measurement data.

Extending the succeeding function protection time period to end substantially following the end of the subsequent measurement interval may cause the apparatus to perform: determining an end of a visibility delay period; determining a remaining measurement interval period; and determining a protection delay period extension for the remaining measurement interval period.

Selecting a subsequent measurement interval measurement data for at least one succeeding function may cause the apparatus to perform: controlling the measurement interval period; and selecting the controlled subsequent measurement interval to provide measurement data.

Controlling the measurement interval period may cause the apparatus to perform: pausing the generation of further measurement interval periods dependent on determining within a measurement interval at least one effective network control function instance; and generating a subsequent measurement interval dependent on determining the at least one effective network control function instance.

According to a fourth aspect there is provided an apparatus comprising: means for determining within a measurement interval at least one effective network control function instance; means for selecting a subsequent measurement interval measurement data for at least one succeeding function; and means for executing the at least one succeeding function dependent on the subsequent measurement interval measurement data.

The means for selecting a subsequent measurement interval measurement data for at least one succeeding function may comprise means for selecting a subsequent measurement interval measurement data with an associated unset or reset measurement flag.

The apparatus may comprise: means for setting a measurement flag dependent on determining the effective network control function instance within the measurement interval; and means for resetting/unsetting the measurement flag on determining a succeeding measurement interval following an end of the at least one function instance visibility delay period.

The means for selecting a subsequent measurement interval measurement data for at least one succeeding function may comprise: means for extending at least one function instance visibility delay period to end substantially at the end of the measurement interval; and means for selecting the subsequent measurement interval following an end of the at least one function instance visibility delay period to provide measurement data.

The means for extending the at least one function instance visibility delay period to end substantially at the end of the measurement interval may comprise: means for determining the end of a visibility delay period; means for determining a remaining measurement interval period; and means for determining a visibility delay period extension for the remaining measurement interval period.

The means for selecting a subsequent measurement interval measurement data for at least one succeeding function may comprise: means for extending a succeeding function protection time period to end substantially following the end of the subsequent measurement interval; and means for selecting the subsequent measurement interval to provide measurement data.

The means for extending the succeeding function protection time period to end substantially following the end of the subsequent measurement interval may comprise: means for determining an end of a visibility delay period; means for determining a remaining measurement interval period; and means for determining a protection delay period extension for the remaining measurement interval period.

The means for selecting a subsequent measurement interval measurement data for at least one succeeding function may comprise: means for controlling the measurement interval period; and means for selecting the controlled subsequent measurement interval to provide measurement data.

The means for controlling the measurement interval period may comprise: means for pausing the generation of further measurement interval periods dependent on determining within a measurement interval at least one effective network control function instance; and means for generating a subsequent measurement interval dependent on determining the at least one effective network control function instance.

A computer program product stored on a medium may cause an apparatus to perform the method as discussed herein.

An electronic device may comprise apparatus as discussed herein.

A chipset may comprise apparatus as discussed herein.

Various other aspects and further embodiments are also described in the following detailed description and in the attached claims.

SUMMARY OF THE FIGURES

The invention will now be described in further detail, by way of example only, with reference to the following examples and accompanying drawings, in which.

DESCRIPTION OF SOME EMBODIMENTS OF THE APPLICATION

Figure 1:
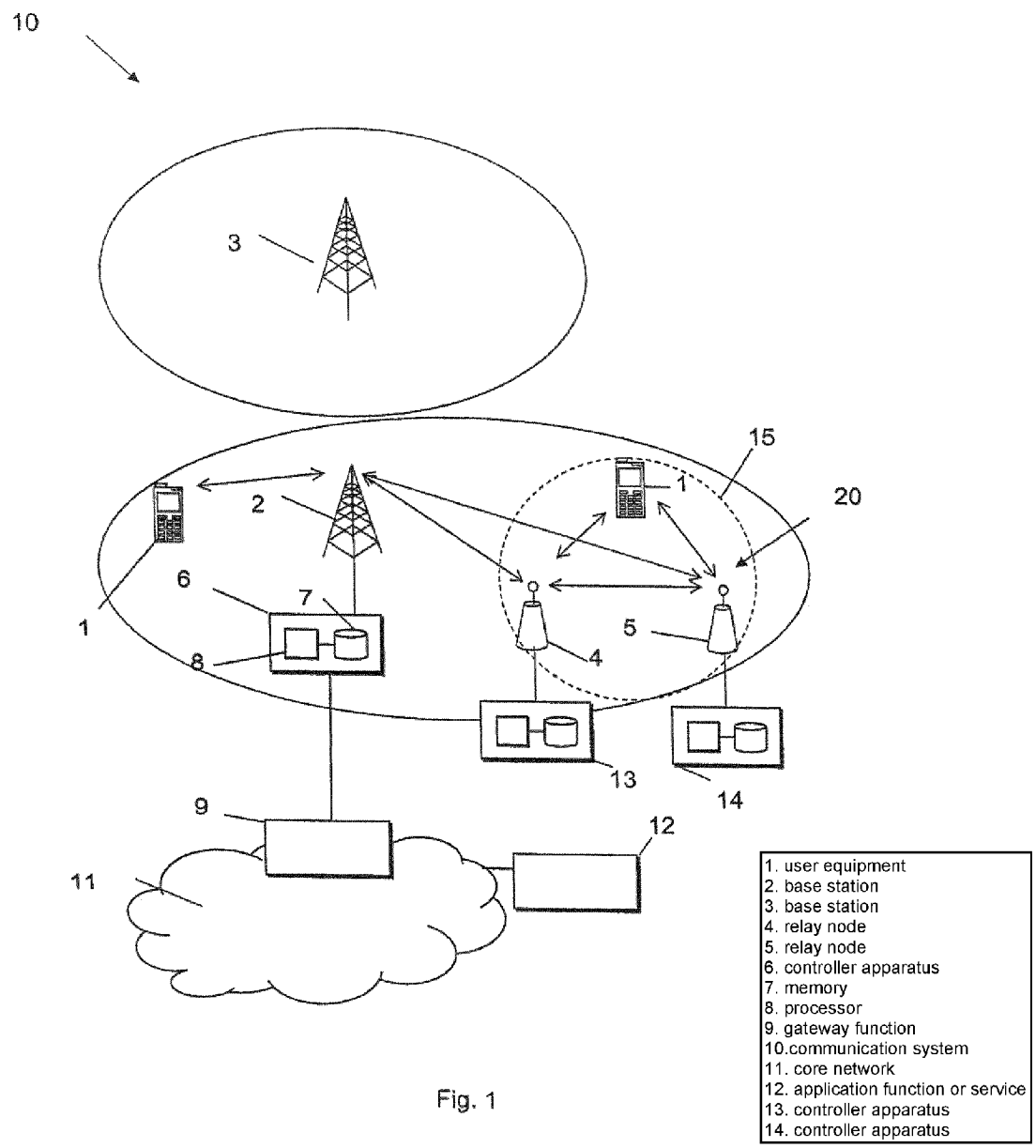
FIG. 1 shows a schematic representation of a network according to some embodiments.

In the following certain exemplifying embodiments are explained with reference to wireless or mobile communication systems serving mobile communication devices.

In particular the application describes self-organising network coordination between different independently operating SON functions. This can be performed, for example, within a SON coordinator. The SON coordinator detects and resolves potential conflicts between SON functions. This resolution can be performed, for example, by rejecting or delaying the execution of a SON function.

Before explaining in detail the certain exemplifying embodiments, certain general principles of a wireless communication system and the nodes thereof are briefly explained with reference to FIGS. 1 and 2 to assist in understanding of the herein described embodiments.

In a communication system 10 a user can be provided with a mobile communication device 1 that can be used for accessing various services and/or applications. The access can be provided via an access interface between the mobile communication device 1 and an appropriate wireless access system of a communication system 10 comprising an access node. An access node or network entity (NE) can be provided by a base station. FIG. 1 shows part of a radio access network (RAN), including a base station 2. The term base station will be used in the following and is intended to include the use of any of these network access nodes or any other suitable network entity. The communication system 10 also comprises a self-organising network management entity (not shown). The self-organising network SON functions can be integrated into the OAM (Network Management) architecture and be communicated via the Itf-S: not standardised and Itf-N: standardised interfaces. In some embodiments the SON functions can also be physically integrated at the NE directly (this is a so-called distributed approach), or they can be integrated at the OAM system (this is a so-called centralised approach).

An appropriate mobile user device or station may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. In some embodiments some devices are not "personal" devices directly "operated" by a human, but devices which are integrated within vehicles, goods, containers. In some embodiments these devices can be used for a range of operations such as goods and/or vehicle tracking, supporting delivery processes, or collecting and providing status data.

A mobile communication device is often called user equipment (UE). Each mobile device 1 and base station 2 may have one or more radio channels open at the same time and may receive signals from more than one source.

FIG. 1 shows a base station 2 having a cell area associated therewith and the base station 2 is connected to relay nodes 4, 5. Each relay node can establish a connection to the base station 2 or alternatively the relay nodes can share the same backhaul link. In the cell area of the base station 2, there can be provided two relay nodes 4 and 5, but it is noted that this is by way of example only. In practice there may be more or less than two relay nodes. In relaying a relay node (RN) is wirelessly connected to the radio-access network via a donor cell, that is the cell of base station 2 of FIG. 1. FIG. 1 also shows neighbouring cells provided by another base station 3 which the relay nodes 4, 5 are not connected to.

Relay nodes may be used, for example, in block of flats and other buildings, offices, warehouses and/or factories and/or in public places, for example in shopping malls, sports or exhibition halls or arenas, particular areas of cities, on moving platforms such as trains, ships, busses, aeroplanes and so on.

The relay nodes 4, 5, can be relatively low power nodes that may be deployed to provide enhanced indoor coverage, additional capacity at hotspots or cell edge regions. For example, in the case of indoor deployment, such an access point or node may be provided for example in apartment blocks or office buildings and hence there may be a relatively high density of such access nodes.

Returning to FIG. 1, there is shown a gateway function 9 of the communication system 10 connecting a core network 11 and/or another network, application functions or services 12. A packet data network may also be provided by means of appropriate gateway nodes. Regardless of the gateway arrangement, a communication device 1 can be connected to an external data network, for example the internet via the relay nodes 4, 5 and/or the base stations 2, 3.

The base stations 2, 3 can be typically controlled by at least one appropriate controller apparatus 6. The relay nodes 4, 5 are also typically controlled by at least one appropriate controller apparatus 13, 14. Furthermore the operation of these controller apparatus can in some embodiments be controlled by the self-organising network management entity not shown.

Figure 2:
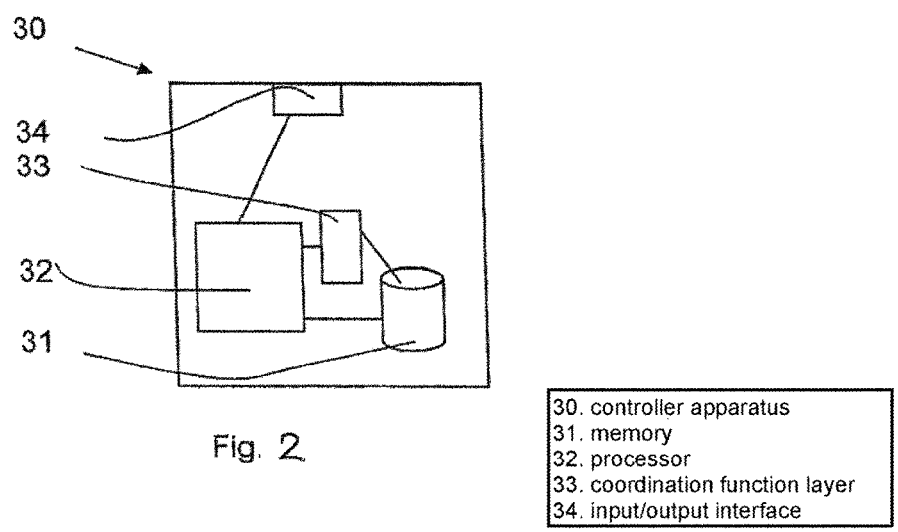
FIG. 2 shows a schematic representation of a control apparatus according to some embodiments.

FIG. 2 shows an example self-organising network management controller apparatus for the network entities (relay nodes 4, 5 or the base stations 2, 3). The controller apparatus 6 is typically provided with at least one memory 31, at least one data processor 32 and an input/output interface 34 as shown in FIG. 2. The control apparatus 6 can further comprise a coordination function layer 33. The control apparatus 6 can be configured to execute appropriate software applications to provide the desired control functions. The control apparatus 6, can in some embodiments be provided in a node and comprising at least one memory and computer program code can be configured, with the at least one processor, to cause the node to communicate with other network entities to communicate control information. At least some of the processing blocks can in some embodiments be carried out by one or more processors in conjunction with one or more memories. The processing block may be provided by an integrated circuit or a chip set. The control apparatus can be interconnected with other control apparatuses.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB or eNB in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

Figure 3:
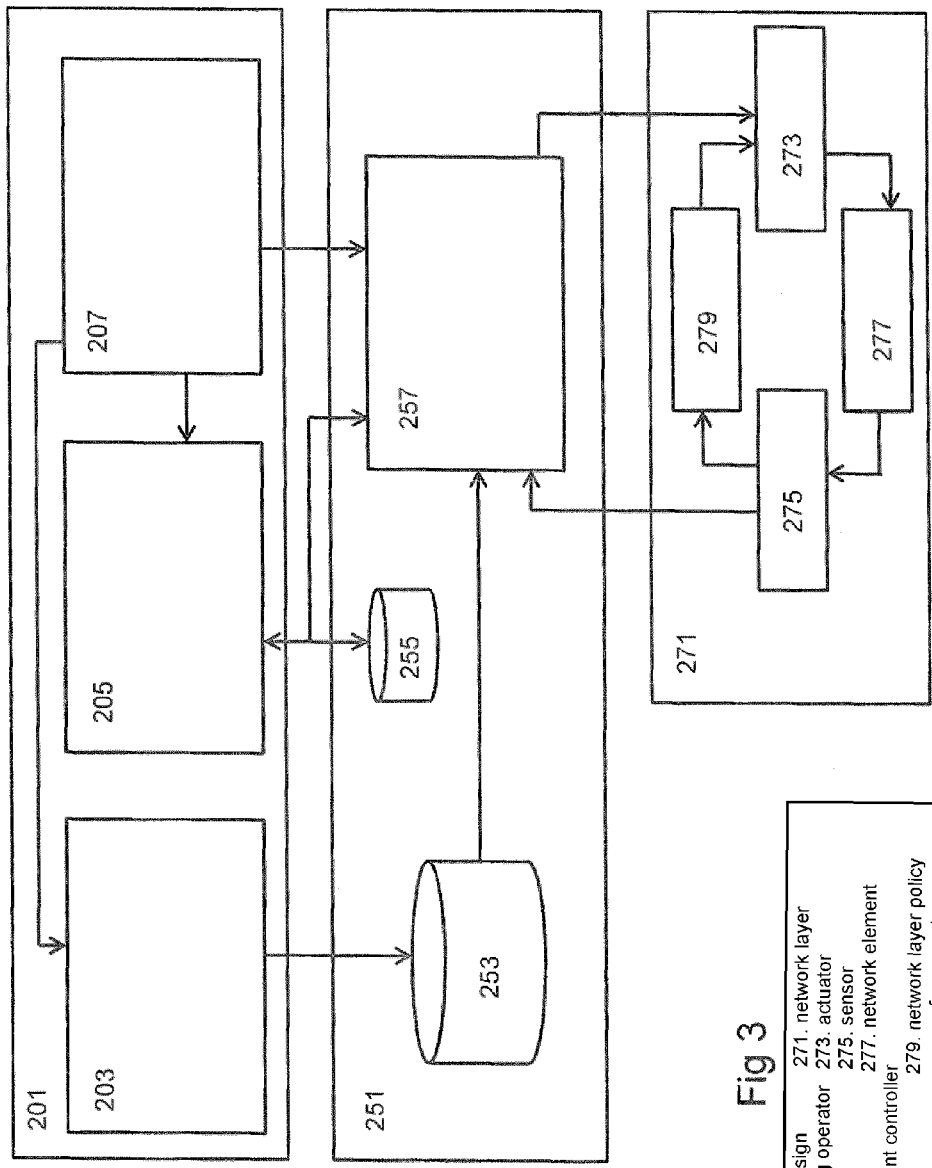
FIG. 3 shows an overview of the self-organising network according to some embodiments.

FIG. 3 shows a schematic overview of an example self-organising network management controller 251 or automated operation administration and management (OAM) function apparatus. With respect to the following examples the operation of the example self-organising network management controller focuses on the organisation of Radio Access Networks (RAN) and in particular for LTE and LTE-A RAN (E-UTRAN).

The self-organising network management controller 251 is shown operating under a pre-planned or network design layer 201 and operating on the network layer 277.

The network design layer 201 is shown comprising a network planning operator 203 configured to produce data detailing the network physical or geographical design and the network topological or logical design and pass this to the self-organising network management controller layer to be stored in the network plan repository 253.

Furthermore the network design layer 201 can comprise a network workflow and policy operator 205 configured to produce design data detailing the operation policies to be applied to the network by the self-organising network management controller layer and stored in a policies storage 255.

The network design layer 201 can furthermore comprises a self-organising network (SON) operator 207 configured to review at a design layer the operation of the self-organising network management controller and propose based on operational experience and feedback information with can be implement in the network workflow and policy operator 205 and the network planning operator 203 as well as being passed to the self-organising network management controller 251.

The self-organising network management controller in some embodiments comprises a repository 253 configured to receive the network information from the network planning operator 203 and configured to supply this information to the self-organising network management controller processor 257.

Furthermore in some embodiments the self-organising network management controller comprises a policy storage 255 configured to receive the policy information from the network workflow and policies operator 205 and further configured to supply the policies information to the self-organising network management controller processor 257.

The self-organising network management controller 251 in some embodiments comprises a self-organising network management controller processor 257 configured to receive network information from the repository 253, policy information from the policies storage 255 and furthermore receive network sensory information from the network layer 275. In some embodiments the coupling between the network layer 275 and the self-organising network management controller processor 257 are a performance management (PM) coupling providing/receiving PM information, a configuration management (CM) coupling providing/receiving CM information and a fault management (FM) coupling providing/receiving FM information. The automation of this process (analysis, decision making) is the concept of SON.

The self-organising network management controller processor 257 can in some embodiments include a coordination function controller or processor, a workflow function controller or processor and a policy enforcement controller or processor.

The network layer 271 can in some embodiments comprise actuators configured to receive the CM, FM and PM information from the self-organising network management controller processor 257 and configured to control the network elements. In some embodiments the actuators 273 can be configured to receive a feedback coupling from a network layer policy enforcement processor 279. It would be understood as described herein that in some embodiments the SON functions can therefore be physically integrated at the NE directly and the SON algorithms running on the network layer policy enforcement processor 279 (this is a so-called distributed approach), or they can be integrated at the OAM system level, and the SON algorithms running on the self-organising network management controller processor 257 (this is a so-called centralised approach). It would be understood that in some embodiments a hybrid approach can be implemented wherein some of the SON algorithms run on the network layer policy enforcement processor 279 and some of the SON algorithms run on the network layer policy enforcement processor 279.

The network layer 271 can furthermore in some embodiments comprise the network elements 277 which are configured by the actuators 273. Furthermore the network elements 277 can be configured to supply a sensor 275 with suitable CM, FM and PM information.

The network layer 271 in some embodiments comprise a sensor monitoring the CM, FM and PM information and supply at least part of this information to a policy enforcement processor within the self-organising network management controller processor and furthermore in some embodiments to a network layer policy enforcement processor 279.

The network layer 271 furthermore in some embodiments can comprise a network layer policy enforcement processor 279 configured to perform local feedback to the actuator 273.

In some embodiments self-organising network management controller processor can be configured to partition the self-organisation tasks into the areas of configuration, optimisation and healing.

Within each partition area is can be possible in some embodiments to define SON use cases. SON use cases can themselves be characterised by a trigger situation (in other words a pre-condition under which a control functionality is activated), the inputs to the use case (which may for example include the targeted network resource), the required steps to fulfil a use case, the output (for example the possible actions to be performed on the network resources), and the result (in other words the post-condition).

It would be understood that SON functions are in some embodiments the realisation of the functionality required by a SON use case. Each SON function can in some embodiments be partitioned into a monitoring part, an algorithm part and, an action or execution part.

For example a monitoring part can be defined by a monitoring of measurements, key performance indicator (KPI) or events relevant to the use case or a trigger situation. In some examples the monitoring part defines a detector functionality for the trigger situation. In some embodiments the monitoring part can be continuously active, scheduled at certain times/time intervals or be triggered on-demand (for example by a human operator).

The algorithm part furthermore in some embodiments can be defined by the acquisition of input data (in addition to monitoring data), an evaluation of network state and context, and a computation of new configurations and whether/when trigger additional tasks/functions are to be performed.

The action part is in some embodiments defined as the enforcement of the algorithm part results.

The SON functions have a generic function area which in some embodiments can be associated with the function. The function area comprises all network resources, and in particular the cells as discussed herein, which have to be manipulated by a SON function to achieve the desired goal. These resources can be defined both in terms of geographical area (where for example the network resources are a set of cells) and/or in terms of topological area (where for example the network resources are a set of router interfaces).

The SON function instances can in some embodiments be defined as the run-time instantiation of a (specific part of a) SON function. They can be understood to act on network resources in a certain area at a certain time. Thus while the "function area" discussed herein is generic (in other words implies that a function works, e.g., on a pair of two adjacent cells). The function instance area, however, is a concrete instantiation of the function (for the example introduced above, a specific pair of cells with IDs X and Y being adjacent to each other).

It would be understood that the SON function instances have a spatial scope (e.g., set of cells, set of network interfaces) and temporal scope (activity in certain time intervals). Furthermore a SON function instance may get active at any time (e.g., triggered by a network measurement crossing a threshold) without any involvement by a human operator or a conventional OAM function. However it would be understood that in some embodiments there may be situations where a SON function instance is started by the human operator. Thus SON function instances can be considered to run or operate "inside" the OAM system and/or the NE.

This therefore is different from traditional network operation and optimisation where data of an entire network domain is "aligned" to the OAM system and then modified (optimised) within a single offline function. When new NE configurations have been computed, they are "rolled out" in the next step. The execution of this alignment/rollout cycle is scheduled/planned and supported by a human operator.

The execution of SON functions can furthermore be considered to be individual and dynamic (in other words not pre-planned and rolled out).

Two aspects of SON function coordination are the granularity period and impact times.

The impact time of an SON function is the time interval during which a SON function being executed has an effect on other SON functions. When receiving a SON function execution request, the SON coordinator evaluates the impact times of previously executed SON functions in order to prevent negative effects on the requesting function. Conflicts can often be prevented by delaying the start of a function execution until after the end of the impact time of the preceding function.

Depending on the type of effect implemented by the SON, the length of the impact time can be longer or shorter. In other words there is no standard impact time for all of the SON functions. However the impact time can be determined to be formed from several time intervals which are specific for different effects.

The impact time of a specific function or instance of a function can be considered to be a combination of an enforcement time period, a visibility delay period and a protection time period.

Figure 4A:
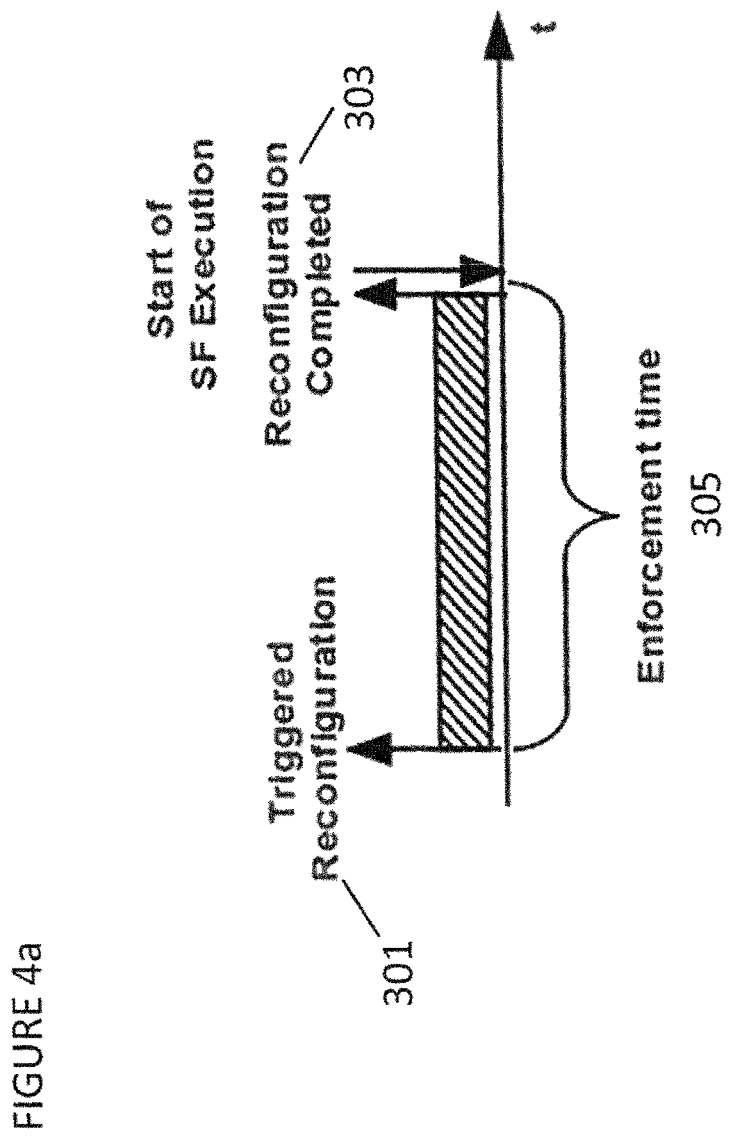
FIGS. 4a to 4c show schematic representations of components of the impact time with respect to an example self-organising network function according to some embodiments.

With respect to FIG. 4a an example of the enforcement time period 305 is shown. The enforcement time period 305 is defined from the instance of triggering the network reconfiguration 301 to the completion of the reconfiguration 303. The enforcement time period 305 can be dependent on many variables, such as the communication delay with the network elements being controlled. Thus, for example, where the SON function has the ability to communicate directly with the network elements being controlled the enforcement time can be shorter than where the configuration changes requested by the SON function has to be enforced through the configuration management (CM) system where there is a longer delay between computation and enforcement of the configuration.

Figure 4B:
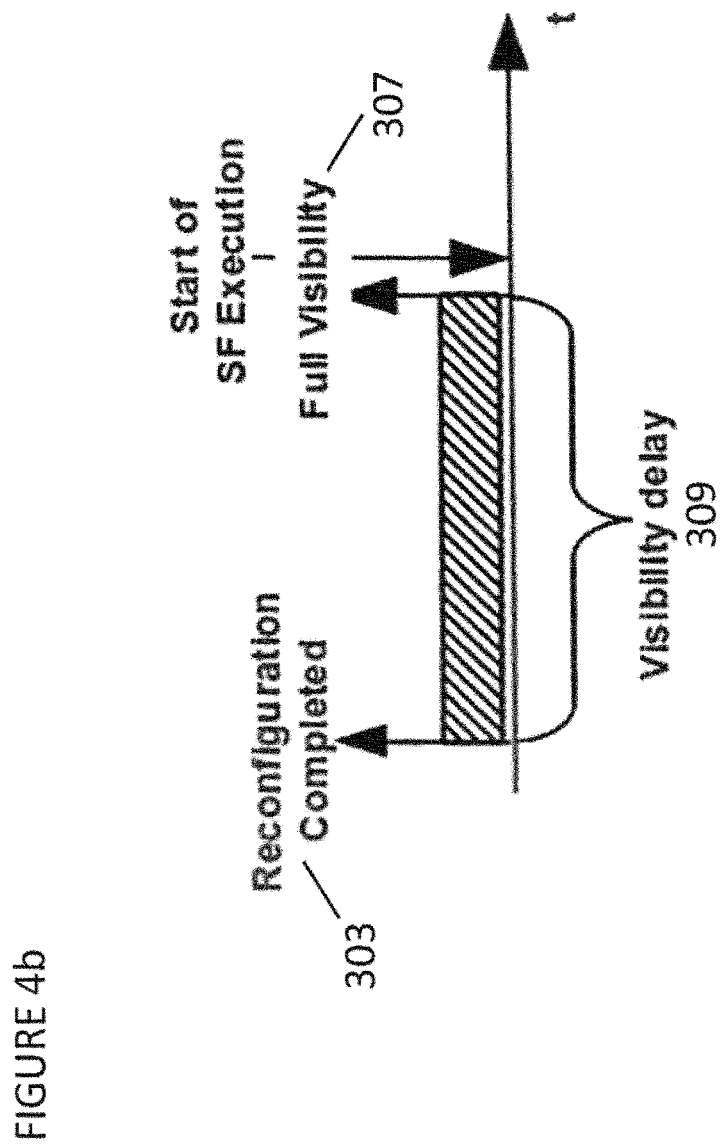

With respect to FIG. 4b an example of the visibility delay period 309 is shown. The visibility delay period 309 is the time period between the completion of the reconfiguration 303 and the full visibility 307 of the configuration. In other word following the reconfiguration instance of the network there would typically be a delay before these changes are visible to any statistical monitoring being performed on the network under control.

For example as many configuration changes performed by the SON functions are targeted to change the behaviour of the network, the results of such changes are evaluated based on measurements from the network. Thus, for example, a performance measurement such as the handover failure rate can be used to evaluate the quality of the mobility robustness optimisation (MRO). Any measurements gathered during a certain time interval will therefore not fully reflect the performed changes.

Figure 4C:
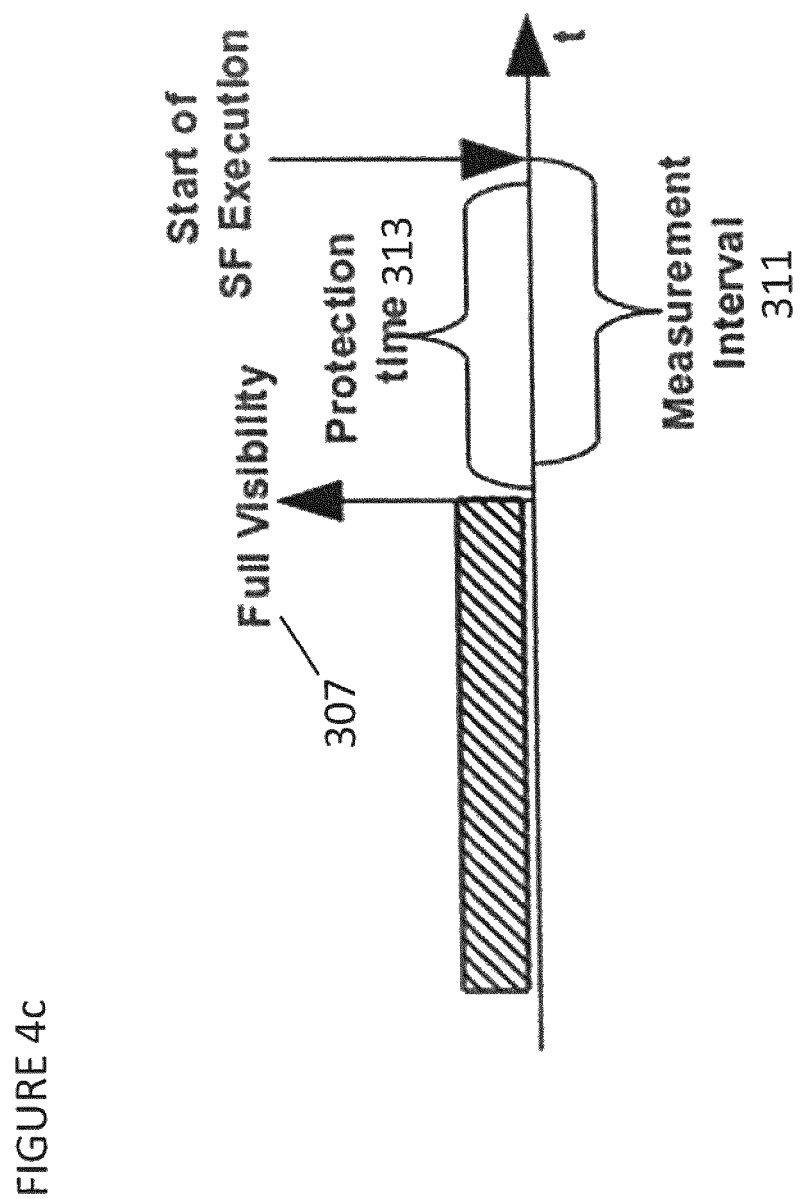

With respect to FIG. 4c, the protection time period 313 is shown. As some SON functions, when they are triggered or initialised, request measurements that have been performed during a certain time interval to be used as inputs to control the function or to permit or compute new configurations so to prevent the earlier configuration from interfering or conflicting with the new function. The measurements used as an input for the function therefore are recorded before the new SON function is triggered. The protection time period 313 therefore is defined as a time period starting at the initiation of a new or further function and after the full visibility instance 307 of the earlier function. Furthermore the protection time 313 is approximately the same time period as the granularity period or measurement interval as shown in FIG. 4c. Thus for example as shown in FIG. 4c the start of the self-organising function occurs at the end of the measurement interval 311 after the end of the protection time 313.

In other words the protection time period 313 is used to assure that only measurements are included that reflect the current state of the network after the end of the previous visibility delay.

As described herein SON functions can thus use measurements as inputs. For example the input can be an observation of the network status and behaviour, the observations being used to determine when a desired SON function is to be started.

The measurements or observations can arrive from different sources, for example network elements such as radio base stations, user equipment, or a performance management system which is part of the operation, administration and maintenance (OAM) system. The measurements can consist of, for example, radio measurements, counters, timers, key performance indicators (KPI) and other suitable indicators. The measurements are generally not real-time, in other words not sent instantly to the requesting target but collected over a certain time period. The measurement interval or time period over which the measurement is made is typically called the granularity period (GP) and is typically defined for each measurement. The measurement data can then be collected over the whole runtime of the granularity period and at the end of the granularity period, the collected measurement data is aggregated to a measurement resource file, this file being transferred to the management system or an SON function and the next granularity period started. The granularity period start and end points are typically fixed. For example a granularity period can be every 10 minutes starting at 11.00, 11.10, 11.20 and so on. These fixed start and end times are usually defined network-wide within an operator domain as the same measurements used as input for SON functions can also be used as standard OAM performance management inputs.

Figure 5:
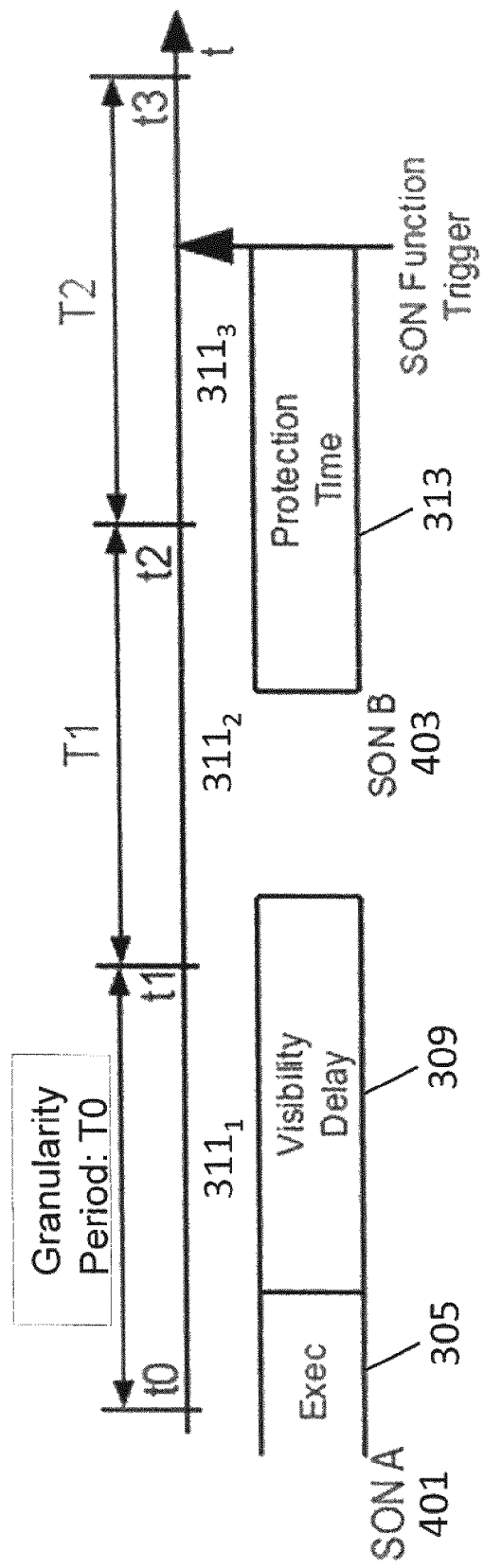
FIG. 5 shows an example time flow representation of the interaction of self-organising network functions.

With respect to FIG. 5, the interaction between SON functions is shown in the impact time flow representation between a first SON function, SON A 401 and a second SON function, SON B 403.

Figure 7:
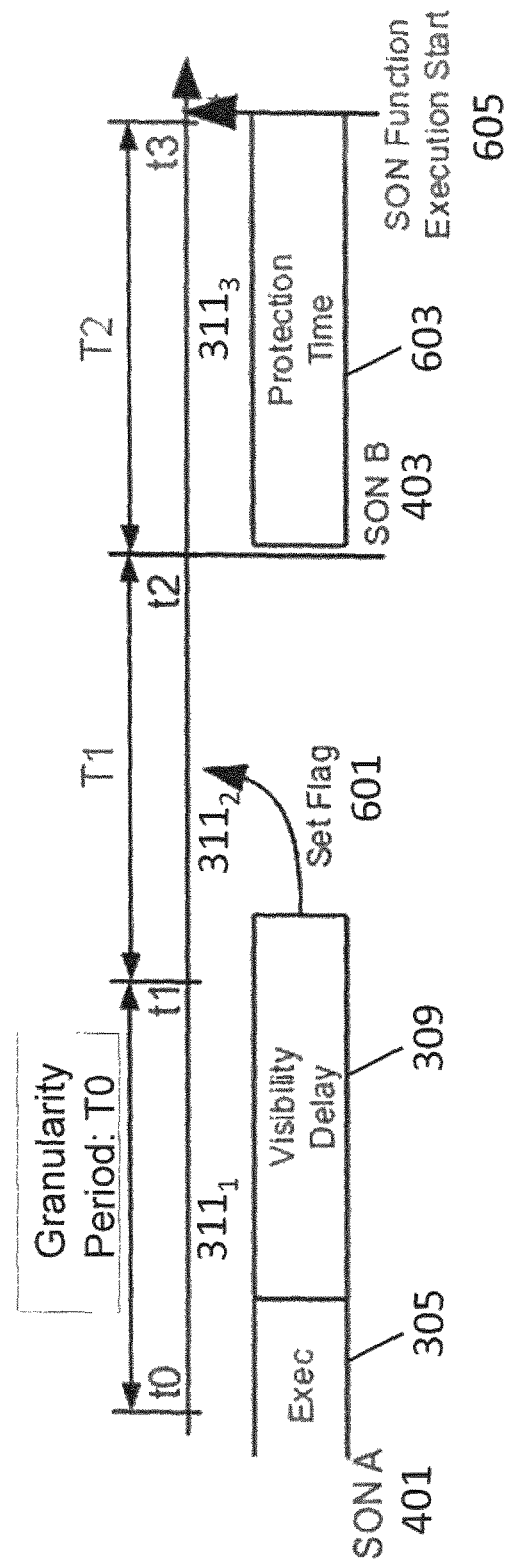
FIG. 7 shows an example time flow representation of the interaction of self-organising network functions according to embodiments represented by the flow diagrams of FIGS. 6a and 6b.
Figure 9:
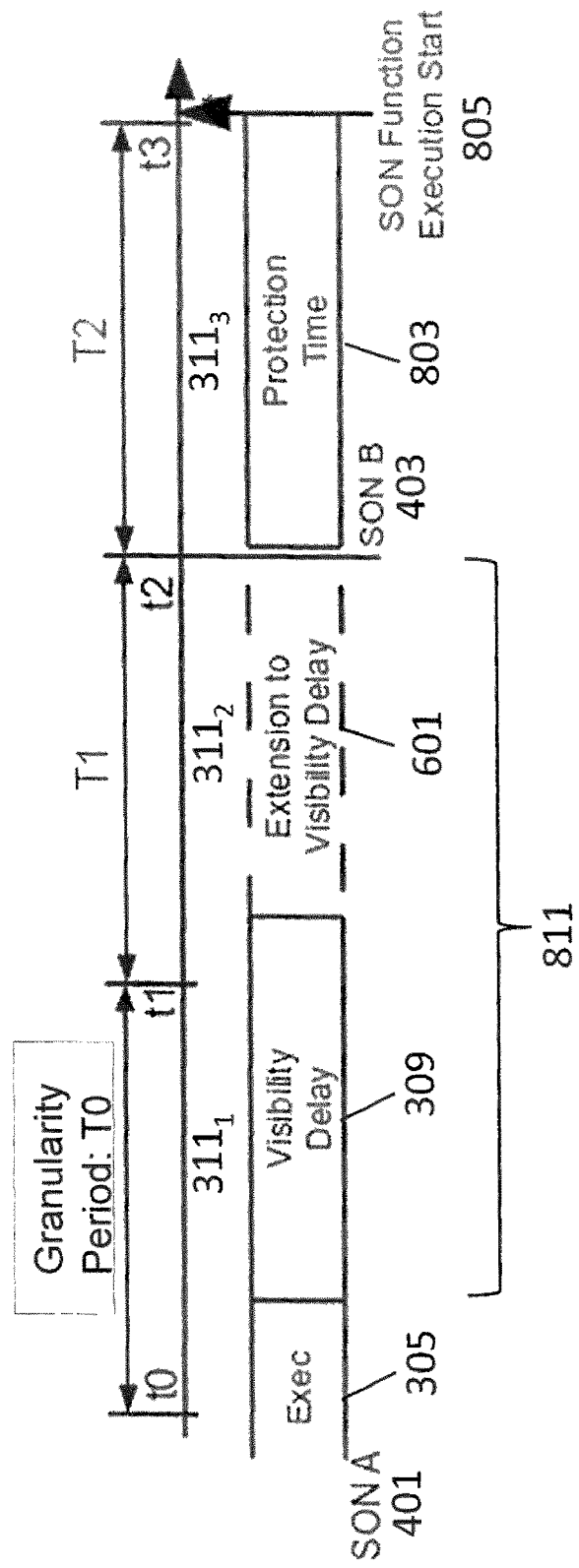
FIG. 9 shows an example time flow representation of the interaction of self-organising network functions according to embodiments represented by the flow diagram of FIG. 8.
Figure 11:
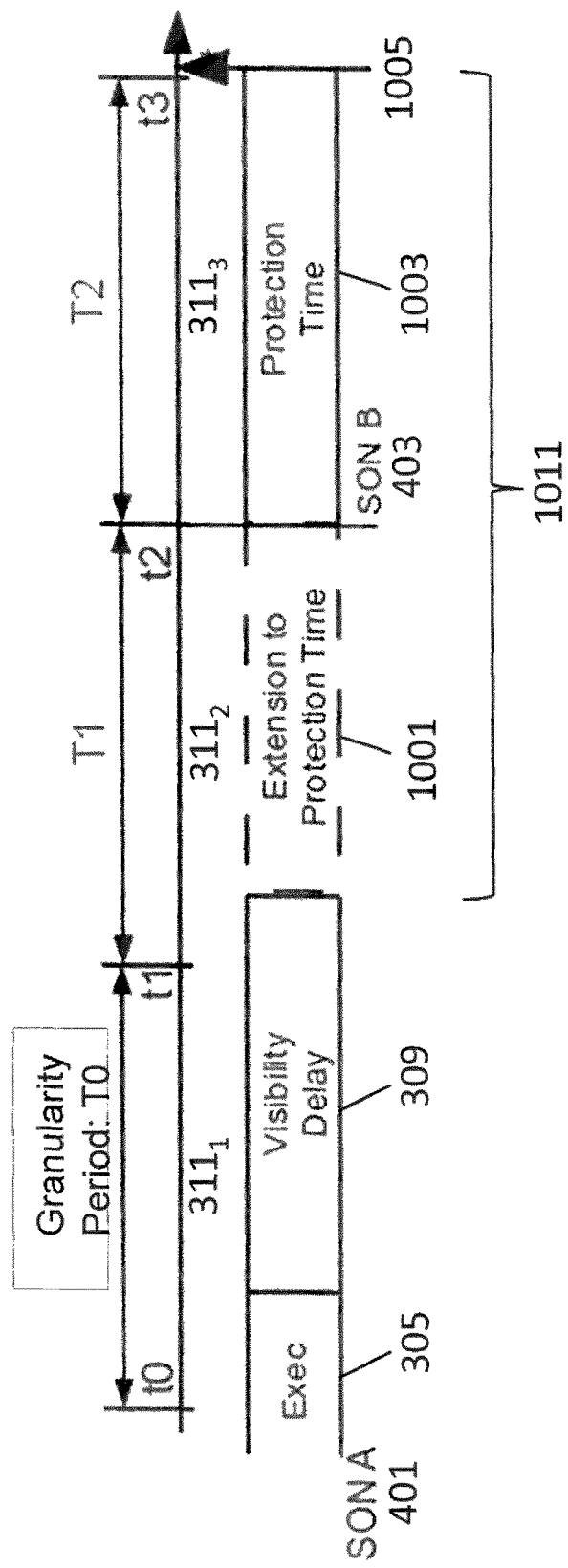
FIG. 11 shows an example time flow representation of the interaction of self-organising network functions according to embodiments represented by the flow diagram of FIG. 10.

The timeline shown in FIG. 5, and also for the FIGS. 7, 9 and 11 show the regular measurement interval or granularity period by the three periods:

between time instance t0 and t1—a first granularity period T0 $311_1$;

between time instance t1 and t2—a second granularity period T1 $311_2$; and between time instance t2 and t3—a third granularity period T2 $311_3$.

The self-organising network function A (SON A 401) has a enforcement or execution time period 305 which ends during the first granularity period T0 $311_1$ and is followed by the visibility delay period 309. The visibility delay period 309 extends throughout the first granularity period and ends during the second granularity period T1 $311_2$. This example shows that the visibility delay period caused by a configuration change performed by a self-organising network function can end at any time within a running granularity period and is not normally synchronised with the measurement interval.

Furthermore as shown in FIG. 5, the protection time period 313 following the visibility delay for the second self-organising network function B (SON B 403) starts during the second granularity period T1 but ends in the middle part of the third granularity period T2 $311_3$. The measurement data available during the third measurement interval at the end of the protection time period 313 is the measurement data determined at the end of the measurement interval T2. This data is therefore collected during the visibility delay period and therefore the measurement data would only partially reflect the new configuration. In other words the data gathered would only be partially statistically significant for the new configuration to be used as an input for the next function. Where there has been a visibility delay of a previously executed SON function ending within this granularity period, the input data of the triggered SON function does not comply with the requirements on statistical significance.

Thus as the protection time period 313 during which information is gathered to trigger the next function such as the second SON function, SON B 403 will not have accurate information concerning the nature of the network as the data collected during the most recently completed granularity period before the actual trigger of the SON function does not fully reflect the current state of the network as the visibility delay time period occurs during the granularity period.

This can cause SON functions to use statistically insignificant measurements as inputs causing the SON function algorithm to compute suboptimal or even erroneous results.

Figure 6A:
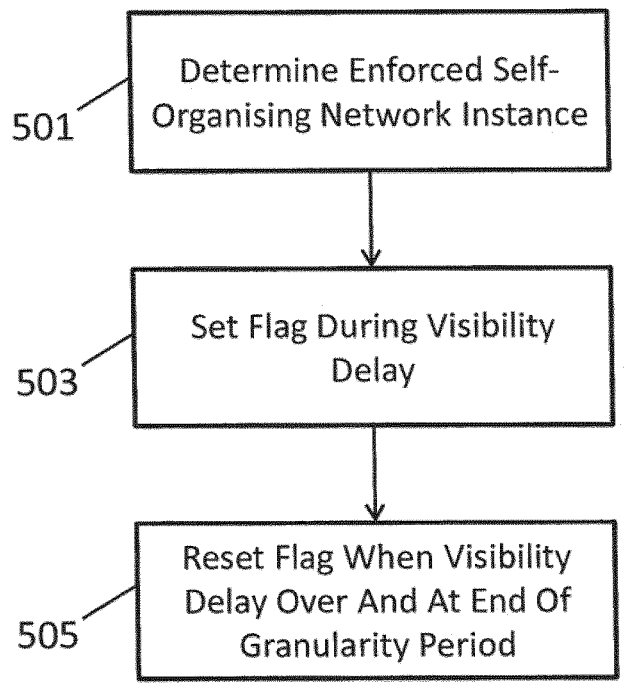
FIGS. 6a and 6b show flow diagrams of the operation of the context determiner according to some embodiments.
Figure 6B:
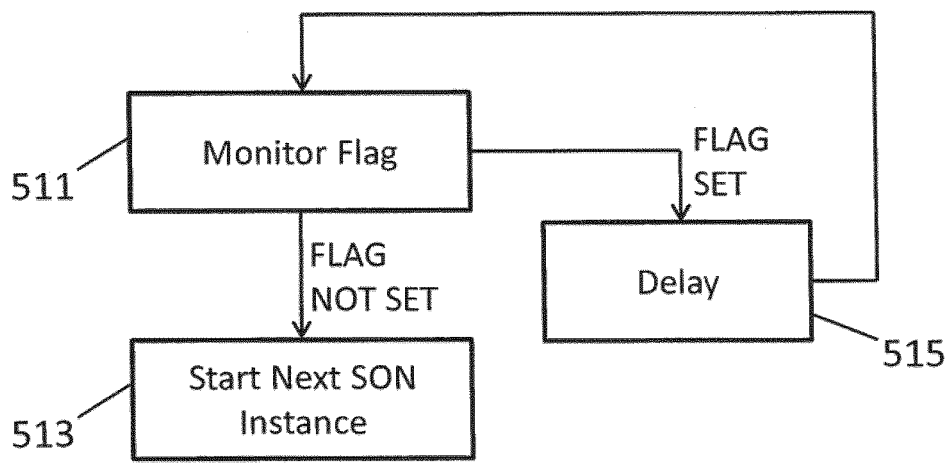

With respect to FIGS. 6a and 6b the operation of the self-organising management controller processor 257 in some embodiments for overcoming such issues as discussed herein are discussed in further detail. Furthermore with respect to FIG. 7 an example timeline showing the first and second SON functions being coordinated and processed by such self-organising management controller processor 257 embodiments is shown.

The self-organising management controller processor 257 in some embodiments can be configured to comprise a measurement flag controller and a measurement flag monitor. The measurement flag controller in some embodiments is configured to monitor whether there is a SON function being implemented with is within the visibility delay period and provide an indication that the current measurement interval may contain old data. The measurement flag monitor in such embodiments monitors this indicator to prevent the self-organising management controller from starting to implement a new function while the indicator is active.

The operation of the measurement flag controller within the self-organising management controller processor 257 can be seen in the flow diagram of FIG. 6a. The measurement flag controller can be configured in some embodiments to receive or monitor the state of the self-organising network function instances. In some embodiments the measurement flag controller can receive information that the self-organising network management controller processor 257 is enforcing or implementing a self-organising network function instance.

The operation of receiving or monitoring that a self-organising network instance is being enforced is shown in FIG. 6a by step 501.

The measurement flag controller can then receive information that the self-organising network function instance is in a visibility delay period.

The measurement flag controller can then set the measurement flag as active. The measurement flag controller can be configured to set the measurement flag as being active at any suitable time during the visibility delay. As shown in FIG. 7 the measurement flag controller sets the flag as being active for example at the end of the visibility delay period.

The operation of setting the measurement flag during the visibility delay is shown in FIG. 6a by step 503. The measurement flag can be used to indicate that the measurement taken within this granularity period is not fully statistically significant and hence cannot be used as an input for another SON function.

The measurement flag controller can be configured to further receive indications or monitor the measurement intervals (in other words the granularity period clock). Furthermore when the visibility delay period has finished or is over then in some embodiments the measurement flag controller can be configured to reset the measurement flag at the end of the granularity period or the start of a new granularity period. Thus in other words the flag will be reset such that the measurements made during the measurement interval or granularity period during which the effect of the previous function is fully visible can be used for measurement data purposes.

The operation of resetting the flag when the visibility delay is over and at the end of the granularity period is shown in FIG. 6a by step 505.

The operation of the measurement flag monitor configured to monitor the measurement flag and protection period to control the execution of a further or another SON function is shown in FIG. 6b.

The measurement flag monitor can be configured to monitor the measurement flag and further receive or monitor when a SON function instance is queued for operation.

The operation of monitoring the flag is shown in FIG. 6b by step 511.

When the self-organising network management controller processor 257 and the measurement flag monitor determines that the flag is set or active then the self-organising management controller processor 257 can be configured to delay the operation of the new SON instance.

The operation of delaying the new SON instance is shown in FIG. 6b by step 515.

The measurement flag monitor can in such embodiments continue to monitor the measurement flag.

When the flag is not set then the measurement flag monitor can permit the self-organising network management controller processor 257 to start the protection time period, in other words to use the next generated measurement data as an input for the next function or instance.

The operation of starting the next SON instance is shown in FIG. 6b by step 513.

It would be understood that implementing a measurement flag generator with the measurement data can be carried out on the management layer where the SON coordinator is implemented or require a corresponding management interface.

With respect to FIG. 7, an example of the operation of the measurement flag controller and the measurement flag monitor is shown for the operation of the first and second SON function instances similar to those shown in FIG. 5. In these embodiments, as shown in FIG. 7, the measurement flag controller is configured on determining a function visibility delay 309 to set or activate a measurement flag 601 which remains active during the second granularity period T1. Furthermore the measurement flag monitor on determining the active measurement flag value is configured to delay the operation or execution of the following self-organising network function SON B 403 until the measurement flag controller resets the measurement flag at the end of the measurement interval following the end of the visibility delay period or at the start of the next measurement interval following the end of the visibility delay period. This effectively delays the start of the protection period 603 into the third granularity period T2 and therefore the enforcement of the SON function to a time after the end of the third granularity period T2 $311_3$. Thus in such an example the second SON function SON B receives measurement data obtained during the third granularity period T2 $311_3$ where the measurement information has statistical significance.

In some embodiments the self-organising network management controller processor 257 comprises a visibility delay extender. In such embodiments the visibility delay extender can be configured to extend the visibility delay period of a SON function to the end of the granularity period following the originally determined visibility delay period.

Figure 8:
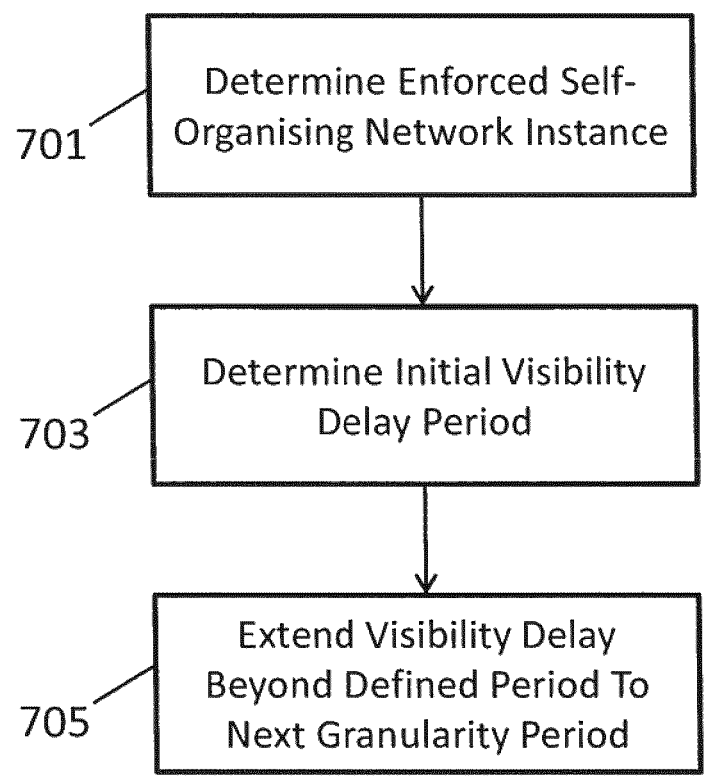
FIG. 8 shows a flow diagram of the operation of the context determiner according to some further embodiments.

With respect to FIG. 8, a flow diagram showing the operations of the visibility delay extender in such embodiments is shown.

The visibility delay extender in some embodiments can be configured to determine or receive information on when a SON instance is being enforced. Thus for example in some embodiments when the self-organising network management controller processor 257 is configured to enforce a self-organising network instance the visibility delay extender is configured to determine that the instance is being enforced.

The operation of determining when the self-organising network instance is being enforced is shown in FIG. 8 by step 701.

The self-organising network management controller processor 257 then can in some embodiments be configured to initialise the visibility delay period at the point following the enforcement delay period indicates that the instance or function has been executed. The visibility delay period can furthermore be sent to or be determined by the visibility delay extender.

The initialisation of the visibility delay period is shown in FIG. 8 by step 703.

The self-organising management controller processor 257 and in some embodiments the visibility delay extender can then be configured to extend the visibility delay beyond the period defined for the function so that the visibility delay is active until the end of the current granularity period or in other words to the next granularity period/measurement interval start.

The operation of extending the visibility delay beyond the defined period to the next granularity period is shown in FIG. 8 by step 705.

By extending the end of the visibility delay to the end of the granularity period implicitly causes the start of any subsequent SON function to be delayed for a complete measurement interval following the end of the original and the extended visibility delay period such that the measurement data has statistical significance.

An example of the dynamic extension of the visibility delay period is shown in FIG. 9 wherein the visibility delay period 309 following the execution/enforcement period 305 for the first self-organising network function SON A 401 is extended by the extension to the visibility delay 801 generating a total visibility delay 811 which ends at the end of the second granularity period T1 $311_2$. Therefore the second self-organising network function SON B 403 and in particular the protection time period 803 is delayed so that the SON function execution start instance 805 occurs after the end of the third granularity period T2 $311_3$ and is able to use measurement data for a measurement interval where there is no visibility delay period.

In some embodiments the self-organising network management controller processor 257 comprises a protection period extender. The protection period extender can be configured to monitor the visibility delay period and extend the protection time period to cover the time period between the end of the visibility delay and the end of the granularity period.

The protection delay extender in some embodiments can be configured to determine or receive information on when a SON instance is being enforced. Thus for example in some embodiments when the self-organising network management controller processor 257 is configured to enforce a self-organising network instance the protection delay extender is configured to determine that the instance is being enforced.

Figure 10:
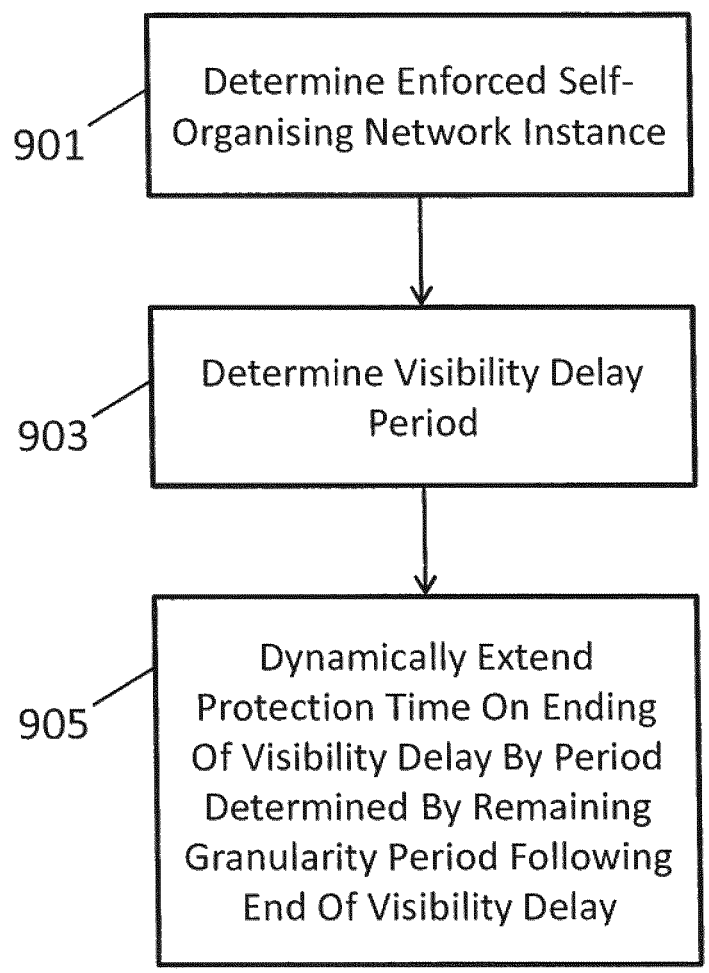
FIG. 10 shows a flow diagram of the operation of the context determiner according to some further embodiments.

The operation of determining when the self-organising network instance is being enforced is shown in FIG. 10 by step 901.

The self-organising network management controller processor 257 can be configured to initialise the visibility delay period. In some embodiments the visibility delay period can be determined by the protection delay extender.

The operation of determining the visibility delay period is shown in FIG. 10 by step 903.

Furthermore the self-organising network management controller processor 257 in specifically in some embodiments the protection delay extender can be configured to determine the protection delay period extension required following the end of a visibility delay such that the determined protection delay period is extended so that the extended protection time period ends following the end of a complete measurement interval/granularity period where there is no visibility delay. For example where the conventional protection time is time period slightly longer than a measurement interval/granularity period then the protection delay time period extension value can be determined as the time difference between the end of the visibility delay and the following granularity period end.

The operation of extending the protection time by a period determined by the remaining granularity period following the end of the visibility delay is shown in FIG. 10 by step 905.

With respect to FIG. 11, an example of the dynamic extension to the protection time is shown. The visibility delay period 309 following the execution/enforcement period 305 for the first self-organising network function SON A 401 ends during the second granularity period T1 311$_2$ and the protection time period 1003 is extended by the protection time extension 1001 generating a total protection time delay 1011 which ends at the end of the second granularity period T1 311$_2$. Therefore the second self-organising network function SON B 403 and in particular the protection time period 1003 is delayed so that the SON function execution start instance 1005 occurs after the end of the third granularity period T2 311$_3$ and is able to use measurement data for a measurement interval where there is no visibility delay period.

In some embodiments the self-organising network management controller processor 257 can comprises a granularity clock stopper. The granularity clock stopper can be configured in some embodiments to set the granularity period.

The granularity clock stopper in some embodiments can be configured to determine or receive information on when a SON instance is being enforced. Thus for example in some embodiments when the self-organising network management controller processor 257 is configured to enforce a self-organising network instance the granularity clock stopper is configured to determine that the instance is being enforced.

Figure 12:
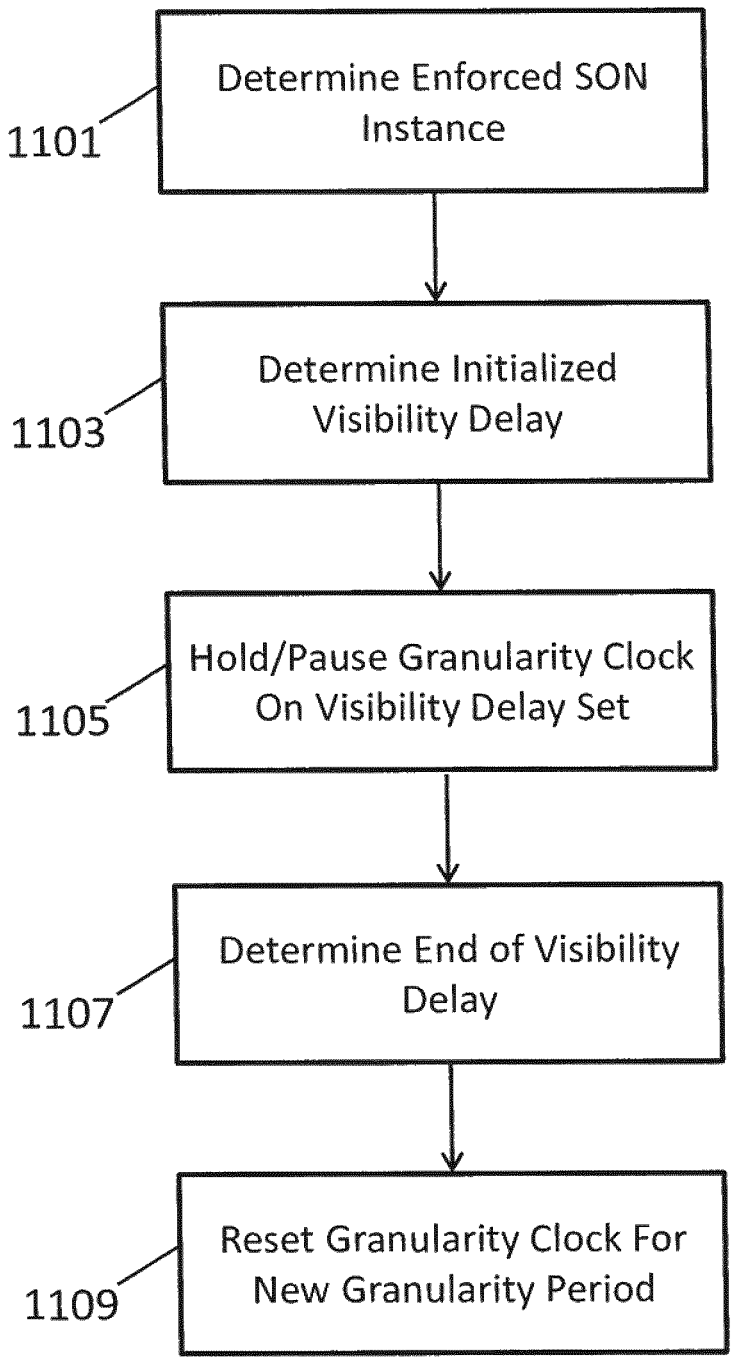
FIG. 12 shows a flow diagram of the operation of the context determiner according to some further embodiments.

The operation of determining when the self-organising network instance is being enforced is shown in FIG. 12 by step 1101.

The self-organising network management controller processor 257 can be configured to initialise the visibility delay period. In some embodiments the visibility delay period can be determined by the granularity clock stopper.

The operation of determining the visibility delay is shown in FIG. 12 by step 1103.

The granularity clock stopper can in such embodiments be configured to control the granularity clock such that the granularity clock is held or paused at the end of a granularity period whilst the visibility delay is occurring.

The holding or pausing of the granularity clock whilst the visibility delay period occurs is shown in FIG. 12 by step 1105.

The granularity clock stopper can furthermore in some embodiments determine the end of the visibility delay period.

The operation of determining of the end of the visibility delay is shown by FIG. 12 by step 1107.

The granularity clock stopper can furthermore in such embodiments be configured to restart the granularity clock for a new granularity period following the determination of the end of the visibility delay.

The operation of restarting the granularity clock for the new granularity period is shown in FIG. 12 by step 1109.

Figure 13:
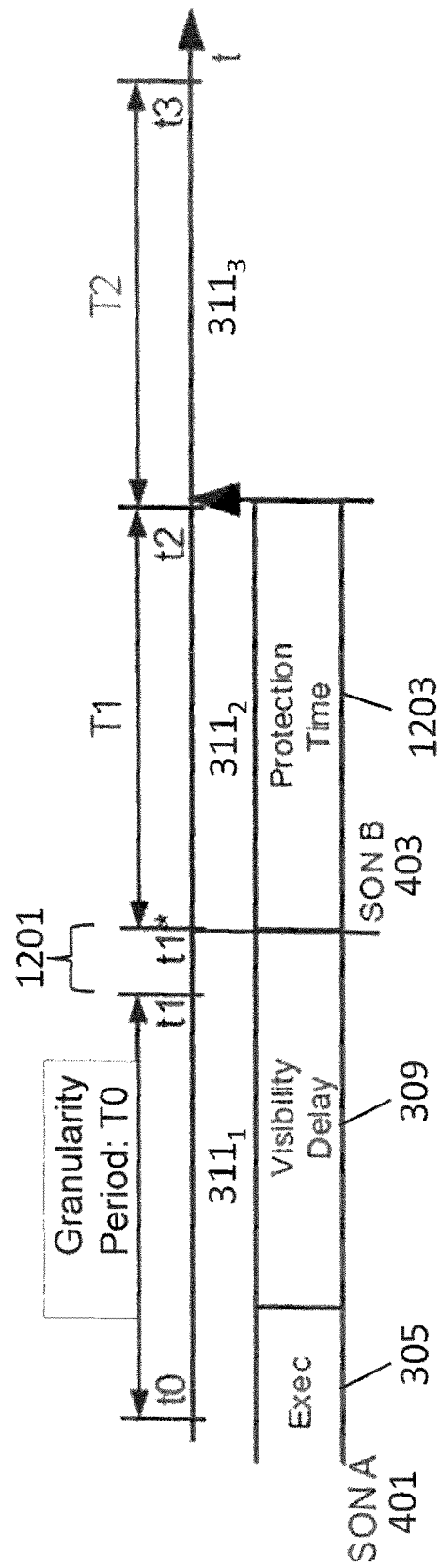
FIG. 13 shows an example time flow representation of the interaction of self-organising network functions according to embodiments represented by the flow diagram of FIG. 12.

Wth respect to FIG. 13, an example of such a dynamic operation is shown wherein the first SON function, SON A 401, visibility delay generates a pause or hold time 1201 following the end of the first granularity period T0 311$_1$ wherein no new granularity periods/measurement intervals are started.

Then as shown in FIG. 13 following the end of the visibility delay period 309 the granularity clock is restarted at time instance t1* defining the start of a second granularity period/measurement interval. Therefore on the initiation of the second self-organising network function SON B 403, and following SON B protection time period 1203 then there is statistically significant measurement after the time instance t2.

It will be understood that by defining the granularity period as described herein in some embodiments, the time gap between two successive self-operating network functions can be set to a minimum.

It would be understood that the introduction of SON coordination would in such embodiments implementing the functions described herein would improve the functioning of an SON system as the potential of conflicts between independently operating SON functions would be reduced. By coordinating the impact times of SON functions and the granularity period of measurements, the implementation of an SON system in the current OAM architecture would reduce the risk of timing overlaps between different independently operating SON functions for the acquisition of measurement data.

It would be understood that as the SON coordinator function, such as implemented in the self-organising network management controller processor 257 in the described examples, has the ability to control and modify the SON functions. Furthermore as the visibility delay and protection time periods are specific to each SON function or to each pair of SON functions, this would enable the SON coordinator to use an existing control interface to adapt the dynamic timings for the periods. In such embodiments the SON coordinator should know the timing settings for the granularity periods provided by the OAM system. The timing settings could, for example, be provided by the configuration settings or the SON coordinator.

The changing granularity period embodiments as described herein permit a time gap between two successive SON functions to be set to a minimum compared to some other embodiments of the features described herein. However the granularity periods may require to be communicated within the domain of an operators' network and thus require a change of the operational mode of the performance management as the acquisition of measurement data which serves as an input to SON functions and the acquisition of measurement data for the standard would have to be separated.

It would be understood that in the embodiments described herein that the selection of subsequent measurement period is not necessarily or should be limited to the immediately succeeding measurement period following the at least one effective network control function instance. In other words the selected measurement period or selected measurements from the granularity period need not be the period immediately following the period within which the network control function (in other words the Self-Organised Network control function or instance) is effective.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method for a self-organizing network employing measurement intervals having fixed start and end points, the method comprising:
   determining that at least one network control function instance is being executed within a first measurement interval and that an impact time of the execution of the at least one network control function ends within the first measurement interval;
   selecting measurement data for at least one succeeding function from a second measurement interval subsequent to the first measurement interval, and wherein the measurement data is associated with an unset or reset measurement flag;
   executing the at least one succeeding function dependent on the selected measurement data;
   setting the measurement flag depending on determining that the at least one network control function instance is being executed within the first measurement interval; and
   resetting or unsetting the measurement flag upon determining a succeeding measurement interval following an end of a function instance visibility delay period of the at least one network control function instance, wherein the function instance visibility delay period is a time period from completion to full visibility of a function instance in a self-organizing network.

2. A method for a self-organizing network employing measurement intervals having fixed start and end points, the method comprising:
   determining that at least one network control function instance is being executed within a first measurement interval and that an impact time of the execution of the at least one network control function ends within the first measurement interval;
   selecting measurement data for at least one succeeding function from a second measurement interval subsequent to the first measurement interval;
   executing the at least one succeeding function dependent on the selected measurement data,
   wherein said selecting comprises:
   extending at least one function instance visibility delay period to end at an end of a measurement interval where there is no function instance visibility delay period, wherein the function instance visibility delay period is a time period from completion to full visibility of the at least one function instance in a self-organizing network; and
   selecting the measurement data from a measurement interval following an end of the at least one function instance visibility delay period.

3. The method as claimed in claim 2, wherein extending the at least one function instance visibility delay period to end at the end of the measurement interval comprises:
   determining an end of the visibility delay period;
   determining a remaining measurement interval period; and
   determining a visibility delay period extension for the remaining measurement interval period.

4. A method for a self-organizing network employing measurement intervals having fixed start and end points, the method comprising:
   determining that at least one network control function instance is being executed within a first measurement interval and that an impact time of the execution of the at least one network control function ends within the first measurement interval;
   selecting measurement data for at least one succeeding function from a second measurement interval subsequent to the first measurement interval;
   executing the at least one succeeding function dependent on the selected measurement data,
   wherein said selecting comprises:
   extending a succeeding function protection time period to end following an end of the second measurement interval, wherein the protection time period is a time period that assures that only those measurements are selected that reflect a current state of the self-organizing network after the end of an impact time of the at least one executed network control function instance; and selecting the measurement data from a measurement interval subsequent to the second measurement interval.

5. The method as claimed in claim 4, wherein extending the succeeding function protection time period to end substantially following the end of the second measurement interval comprises:
  determining an end of a visibility delay period, wherein the visibility delay period is a time period from completion to full visibility of a function instance in a self-organizing network;
  determining a remaining measurement interval period; and
  determining a protection delay period extension for the remaining measurement interval period.

6. An apparatus for a self-organizing network employing measurement intervals having fixed start and end points, the apparatus comprising at least one processor and at least one memory including computer code for one or more programs, wherein the at least one memory and the computer code are configured to with the at least one processor to cause the apparatus to at least perform:
  determining that at least one network control function instance is being executed within a first measurement interval and that an impact time of the execution of the at least one network control function ends within the first measurement interval;
  selecting measurement data for at least one succeeding function from a second measurement interval subsequent to the first measurement interval; and
  executing the at least one succeeding function dependent on the selected measurement data,
  wherein said selecting comprises:
    extending at least one function instance visibility delay period to end at the end of a measurement interval where there is no function instance visibility delay period, wherein the function instance visibility delay period is a time period from completion to full visibility of a function instance in the self-organizing network; and
    selecting measurement data from a measurement interval following an end of the at least one function instance visibility delay period.

7. An apparatus for a self-organizing network employing measurement intervals having fixed start and end points, the apparatus comprising at least one processor and at least one memory including computer code for one or more programs, wherein the at least one memory and the computer code are configured to with the at least one processor to cause the apparatus to at least perform:
  determining that at least one network control function instance is being executed within a first measurement interval and that an impact time of the execution of the at least one network control function ends within the first measurement interval;
  selecting measurement data for at least one succeeding function from a second measurement interval subsequent to the first measurement interval; and
  executing the at least one succeeding function dependent on the selected measurement data,
  wherein said selecting comprises:
    extending a succeeding function protection time period to end following an end of the second measurement interval, wherein the protection time period is a time period that assures that only those measurements are selected that reflect a current state of the self-organizing network after the end of the impact time of the at least one executed network control function instance; and
    selecting the measurement data from a measurement interval subsequent to the second measurement interval.

8. An apparatus for a self-organizing network employing measurement intervals having fixed start and end points, the apparatus comprising:
  an instance determiner configured to determine that at least one network control function instance is being executed within a first measurement interval and that an impact time of the execution of the at least one network control function ends within the first measurement interval;
  a data selector configured to select measurement data for at least one succeeding function from a second measurement interval subsequent to the first measurement interval; and
  an instance executor configured to execute the at least one succeeding function dependent on the selected measurement data,
  wherein the data selector is configured to:
    extend at least one function instance visibility delay period to end at the end of a measurement interval where there is no function instance visibility delay period, wherein the function instance visibility delay period is a time period from completion to full visibility of the at least one function instance in a self-organizing network; and
    select measurement data from a measurement interval following an end of the at least one function instance visibility delay period.

9. An apparatus for a self-organizing network employing measurement intervals having fixed start and end points, the apparatus comprising:
  an instance determiner configured to determine that at least one network control function instance is being executed within a first measurement interval and that an impact time of the execution of the at least one network control function ends within the first measurement interval;
  a data selector configured to select measurement data for at least one succeeding function from a second measurement interval subsequent to the first measurement interval; and
  an instance executor configured to execute the at least one succeeding function dependent on the selected measurement data,
  wherein the data selector is configured to:
    extend a succeeding function protection time period to end following the end of the second measurement interval, wherein the protection time period is a time period that assures that only those measurements are selected that reflect the current state of the self-organizing network after the end of the impact time of the at least one executed network control function instance; and
    select the measurement data from a measurement interval subsequent to the second measurement interval.

10. An apparatus for a self-organizing network employing measurement intervals having fixed start and end points, the apparatus comprising at least one processor and at least one memory including computer code for one or more programs, wherein the at least one memory and the computer code are configured to with the at least one processor to cause the apparatus to at least perform:
- determining that at least one network control function instance is being executed within a first measurement interval and that an impact time of the execution of the at least one network control function ends within the first measurement interval;
- selecting measurement data for at least one succeeding function from a second measurement interval subsequent to the first measurement interval, and wherein the measurement data is associated with an unset or reset measurement flag;
- executing the at least one succeeding function dependent on the selected measurement data;
- setting the measurement flag depending on determining that the at least one network control function instance is being executed within the first measurement interval; and
- resetting or unsetting the measurement flag upon determining a succeeding measurement interval following an end of a function instance visibility delay period of the at least one network control function instance, wherein the function instance visibility delay period is a time period from completion to full visibility of a function instance in a self-organizing network.

* * * * *